(12) United States Patent
Miller et al.

(10) Patent No.: US 10,625,846 B2
(45) Date of Patent: *Apr. 21, 2020

(54) ADAPTABLE ROTOR CONTROL SYSTEM FOR A VARIABLE NUMBER OF BLADES

(71) Applicant: Bell Helicopter Textron Inc., Fort Worth, TX (US)

(72) Inventors: Gary Miller, North Richland Hills, TX (US); Frank B. Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,057

(22) Filed: May 9, 2019

(65) Prior Publication Data

US 2019/0263502 A1 Aug. 29, 2019

Related U.S. Application Data

(63) Continuation of application No. 15/693,397, filed on Aug. 31, 2017, now Pat. No. 10,358,207.

(51) Int. Cl.
*B64C 11/06* (2006.01)
*B64C 11/32* (2006.01)
(Continued)

(52) U.S. Cl.
CPC ............ *B64C 11/32* (2013.01); *B64C 11/06* (2013.01); *B64C 11/30* (2013.01); *B64C 27/605* (2013.01);
(Continued)

(58) Field of Classification Search
CPC ......... B64C 11/06; B64C 11/30; B64C 11/32; B64C 11/34; B64C 11/343; B64C 27/605;
(Continued)

(56) References Cited

U.S. PATENT DOCUMENTS 8,360,721 B2   1/2013  Podgurski et al.
9,457,889 B2 * 10/2016  Filter ..................... B64C 27/46
(Continued)

FOREIGN PATENT DOCUMENTS

EP    2733072 A1   5/2014
EP    3450308 A1   3/2019

OTHER PUBLICATIONS

EPO Examination Report issued in EP Application 17195083.5 dated Jun. 1, 2018, 4 pages.
EPO Search Report issued in EP Application 17195083.5 dated May 7, 2018, 4 pages.

*Primary Examiner* — Erick R Solis
(74) *Attorney, Agent, or Firm* — Patent Capital Group (57) ABSTRACT

In one embodiment, a rotor hub comprises a yoke for attaching a plurality of rotor blades, a constant velocity joint to drive torque from a mast to the yoke and to enable the yoke to pivot, and a rotor control system configured to adjust an orientation of the plurality of rotor blades. Moreover, the rotor control system comprises: a swashplate, a phase adapter fulcrum, a plurality of actuators controlled based on a flight control input, a plurality of lower pitch links configured to transfer motion between the plurality of actuators and the swashplate, a plurality of phase adjustment levers configured to adjust a control phase associated with motion transferred between the plurality of actuators and the plurality of lower pitch links, and a plurality of upper pitch links configured to adjust a pitch of the plurality of rotor blades, wherein there are more upper pitch links than lower pitch links.

20 Claims, 6 Drawing Sheets

(51) Int. Cl.
*B64C 29/00* (2006.01)
*B64C 11/30* (2006.01)
*B64C 27/605* (2006.01)
*B64C 27/72* (2006.01)

(52) U.S. Cl.
CPC .. *B64C 29/0033* (2013.01); *B64C 2027/7216* (2013.01); *B64C 2027/7255* (2013.01)

(58) Field of Classification Search
CPC .... B64C 2027/7216; B64C 2027/7255; B64C 29/0033
See application file for complete search history.

(56) References Cited

U.S. PATENT DOCUMENTS

| | | | |
|---|---|---|---|
| 9,476,312 B2 * | 10/2016 | Foskey | F01D 7/00 |
| 2002/0187041 A1 * | 12/2002 | Arnold | B64C 27/605 |
| | | | 416/25 |
| 2014/0234102 A1 * | 8/2014 | Fenny | B64C 27/72 |
| | | | 416/1 |
| 2014/0248150 A1 | 9/2014 | Sutton et al. | |
| 2014/0271203 A1 * | 9/2014 | Foskey | F01D 7/00 |
| | | | 416/147 |
| 2015/0274290 A1 | 10/2015 | Fenny et al. | |
| 2018/0273160 A1 * | 9/2018 | Baldwin | B64C 11/34 |
| 2019/0016441 A1 * | 1/2019 | Schank | B64C 11/28 |
| 2019/0016455 A1 * | 1/2019 | Kizhakkepat | B64C 29/0033 |
| 2019/0061915 A1 | 2/2019 | Miller et al. | |

* cited by examiner

ADAPTABLE ROTOR CONTROL SYSTEM FOR A VARIABLE NUMBER OF BLADES

CROSS-REFERENCE TO RELATED APPLICATION

This application is a continuation and claims the benefit of priority under 35 U.S.C. § 120 of U.S. application Ser. No. 15/693,397, filed on Aug. 31, 2017, entitled "ADAPTABLE ROTOR CONTROL SYSTEM FOR A VARIABLE NUMBER OF BLADES," Inventors Gary Miller and Frank B. Stamps. The disclosure of the prior application is considered part of and is incorporated in its entirety by reference in the disclosure of this application.

TECHNICAL FIELD

This disclosure relates generally to aircraft design, and more particularly, though not exclusively, to rotor systems for rotorcraft.

BACKGROUND

The flight capabilities of rotorcraft are provided by rotors. The design of a rotor, however, implicates numerous considerations and can be a challenging aspect of rotorcraft design. For example, during operation, a rotorcraft is subjected to various aerodynamic forces that may cause the blades of the rotor to flap and/or cone, which can lead to instability. Accordingly, minimizing the instability caused by blade flapping and blade coning may be a design consideration. Another design consideration may be the number of blades on the rotor. As the number of blades on a rotor increases, the complexity of the rotor increases, while the spacing between each blade decreases. Designing a rotor that achieves the appropriate balance of the various performance considerations can be challenging.

SUMMARY

According to one aspect of the present disclosure, a rotor hub comprises a yoke for attaching a plurality of rotor blades, a constant velocity joint to drive torque from a mast to the yoke and to enable the yoke to pivot, and a rotor control system configured to adjust an orientation of the plurality of rotor blades. Moreover, the rotor control system comprises: a swashplate, a phase adapter fulcrum, a plurality of actuators controlled based on a flight control input, a plurality of lower pitch links configured to transfer motion between the plurality of actuators and the swashplate, a plurality of phase adjustment levers configured to adjust a control phase associated with motion transferred between the plurality of actuators and the plurality of lower pitch links, and a plurality of upper pitch links configured to adjust a pitch of the plurality of rotor blades, wherein there are more upper pitch links than lower pitch links.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
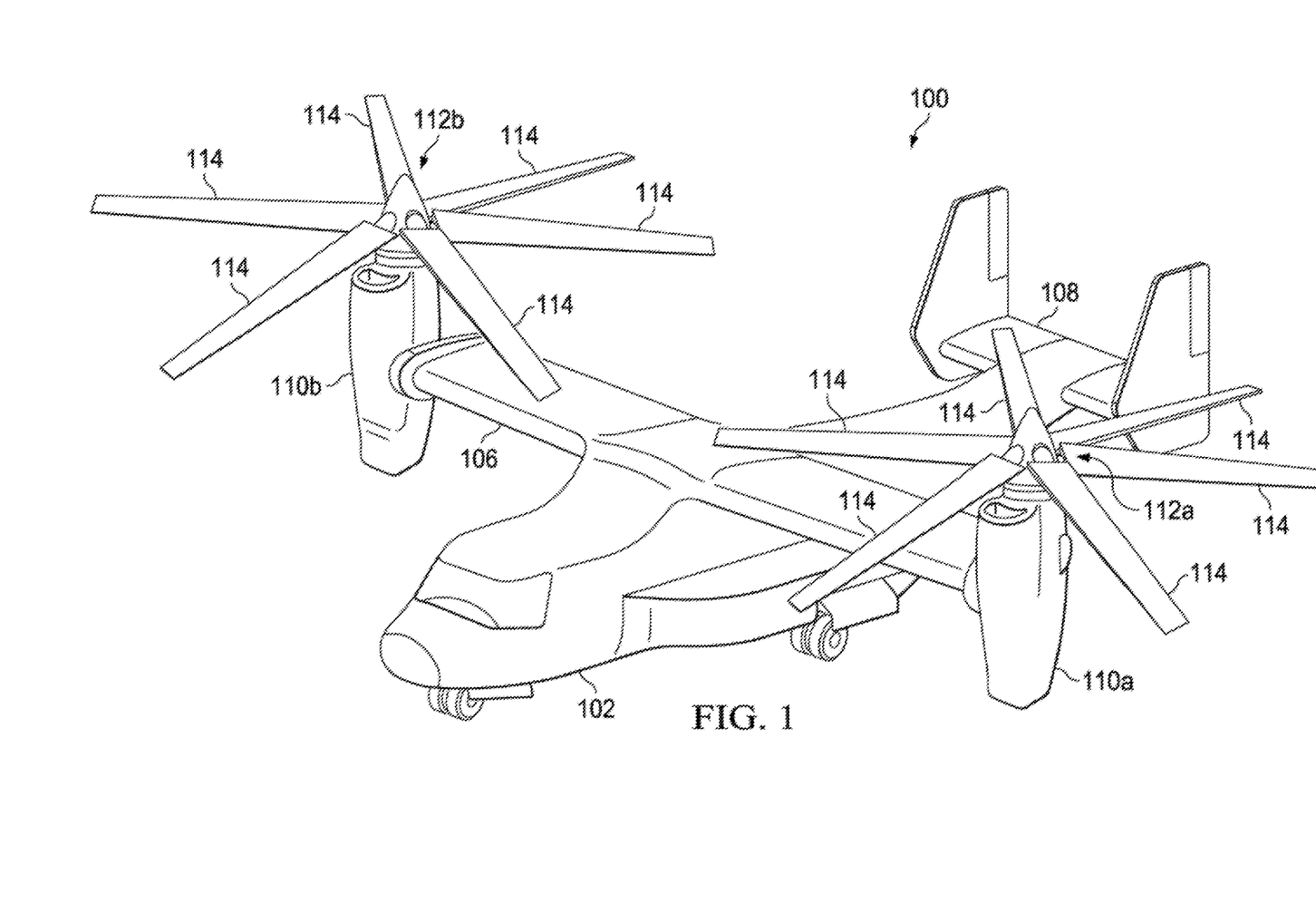
FIG. 1 illustrates an example aircraft in accordance with certain embodiments.

FIG. 1 illustrates an example aircraft 100 in accordance with certain embodiments. In the illustrated embodiment, aircraft 100 is a tiltrotor aircraft, which includes a fuselage 102, wing 106, nacelles 110a and 110b, and empennage 108. The fuselage 102 is the main body of tiltrotor aircraft 100, and may include a cabin (e.g., for crew, passengers, and/or cargo) and/or certain mechanical and electrical components (e.g., engine(s), transmission, and/or flight controls). Nacelles 110a and 110b respectively include rotor systems 112a and 112b, which each include a plurality of rotor blades 114. Moreover, each nacelle 110a and 110b may include an engine and gearbox for driving rotor systems 112a and 112b, respectively.

In some embodiments, nacelles 110a and 110b may each be configured to alternate between a helicopter mode, in which the nacelles are approximately vertical, and an airplane mode, in which the nacelles are approximately horizontal. The empennage 108 is the tail assembly of tiltrotor aircraft 100, and includes horizontal and vertical stabilizers in order to provide improved stability and control.

Tiltrotor aircraft 100 relies on rotor systems 112a,b for flight capabilities, such as generating lift and providing control, and is capable of alternating between helicopter and airplane modes. Each rotor system 112 includes a plurality of rotor blades 114 coupled to a hub, and torque generated by the engine(s) causes the rotor blades 114 to rotate, which in turn generates lift. Moreover, the pitch of each rotor blade 114 can be adjusted in order to selectively control direction, thrust, and lift for tiltrotor aircraft 100. The design of a rotor system, however, implicates numerous performance considerations (e.g., aerodynamics, weight, strength), and can be a challenging aspect of aircraft design. For example, a rotorcraft is subjected to various aerodynamic forces during operation, such as lift, drag, centrifugal force, and so forth. Lift is a directional force (e.g., upward) produced by the rotation of the rotor blades, which allows a rotorcraft to elevate and/or travel in a particular direction. In some cases, however, lift may subject the rotor blades to flapping. For example, flapping can result from a dissymmetry of lift produced by rotor blades at different positions during a single rotation. In particular, the relative wind speed encountered by a rotor blade increases as the blade advances in the direction of travel, but decreases as the blade retreats in the opposite direction, which causes the rotor blade to generate more lift while advancing than while retreating. In this manner, because the advancing blades of a rotor system generate more lift than the retreating blades, a dissymmetry of lift results that can cause significant instability. To accommodate this dissymmetry of lift, a rotor system may allow the rotor blades to flap up and down as they rotate, which causes the advancing blades to flap up while the retreating blades flap down. For example, the increased lift produced by advancing rotor blades causes them to flap up, while the reduced lift produced by retreating rotor blades causes them to flap down.

Excessive flapping can also cause instability, however, and thus minimizing the effects of flapping is an important design consideration for a rotor system. Accordingly, to compensate for the effects of flapping, a rotor system may be designed with a "delta-3" or pitch-flap coupling, which causes blade flapping to induce a change in blade pitch that counteracts the instability from flapping. In some cases, pitch-flap coupling can be implemented by offsetting the pitch horn from the flapping axis. The location of the pitch horn relative to the flapping axis, for example, dictates how blade flapping impacts the blade pitch. If the pitch horn is aligned with the flapping axis, then no change in blade pitch is induced by flapping. However, if the pitch horn is offset from the flapping axis, then a change in blade pitch is induced by flapping. The amount of blade pitch change induced by a given amount of blade flapping is dictated by the delta-3 angle, or the angle between the pitch horn and the flapping axis. For example, assuming the pitch horn to pitch link joint is positioned on the outboard side of the flapping hinge, a positive delta-3 angle is achieved when the pitch horn is positioned on the leading-edge side of a rotor blade, while a negative delta-3 angle is achieved when the pitch horn is positioned on the trailing-edge side. Moreover, a positive delta-3 angle results in a flap-up pitch-down coupling, meaning an upward flap causes a decrease in blade pitch, while a downward flap causes an increase in blade pitch. A negative delta-3 angle results in a flap-up pitch-up coupling, meaning an upward flap causes an increase in blade pitch, while a downward flap causes a decrease in blade pitch. In this manner, a rotor system can be implemented with an appropriate pitch-flap coupling designed to minimize the effects of flapping and thus improve stability. This is particularly important for tiltrotor aircraft, as the detrimental effects of flapping can result in significant instability during high-speed flight with axial airflow through the rotors. Accordingly, in some cases, the optimal delta-3 angle for the rotors of a tiltrotor aircraft may be in the range of −5 to −15 degrees (e.g., −10 degrees) to minimize flapping instability.

Aerodynamic forces can also subject rotor blades to "coning," which refers to a vertical bending of rotor blades in a manner that resembles a "cone" shape. Coning can also cause instability, and thus minimizing the effects of coning is another important design consideration for a rotor system. Accordingly, in some cases, a rotor system may be designed with a pitch-cone or "delta-0" coupling. A pitch-cone coupling causes a blade pitch change to be induced in response to blade coning, which alters the aerodynamic coning forces acting on the rotor and improves the stability of the rotor. The delta-0 parameter for pitch-cone coupling dictates the amount of blade pitch change that is induced for a given amount of blade coning motion. In conventional rotor systems, the delta-0 parameter is dictated by the location of the pitch horn relative to the coning flexure. However, given that the delta-3 and delta-0 parameters are both tied to the location of the pitch horn in conventional rotor systems, in some cases conventional rotor systems may be able to only implement either pitch-flap coupling or pitch-cone coupling, but not both.

Another important design consideration for a rotor system is the number of rotor blades. For example, using fewer blades increases the efficiency of a rotor while reducing its cost and complexity. Increasing the number of blades, however, can increase power and produce more lift, and/or reduce the rotor size (e.g., by decreasing the blade length and/or chord), rotations-per-minute (RPM), and/or blade tip speed, which also reduces noise and vibration. In some cases, it may be sufficient to implement a tiltrotor aircraft using three blades per rotor. The Bell Boeing V-22 Osprey, for example, is a tiltrotor aircraft with three blades on each rotor. In other cases, however, it may be desirable to use more than three blades on each rotor. As the number of blades on a rotor increases, however, the spacing between blades decreases and it becomes more challenging to implement the appropriate delta-3 pitch-flap coupling using conventional rotor control systems, because the location of each pitch horn begins to interfere with the neighboring blade. Accordingly, conventional control systems are unsuitable for tiltrotors with more than three blades, as they may be unable to achieve the optimal delta-3 pitch-flap coupling for tiltrotor aircraft.

Accordingly, this disclosure describes various embodiments of a rotor that can achieve the appropriate pitch-flap coupling for any number of rotor blades. In some embodiments, for example, a rotor may include control phase adapters to adapt its control system to a number of rotor blades "n" that exceeds the number of underlying control links in the control system. In some embodiments, for example, the rotor may include a control system with 3 actuators, 3 lower pitch links, and 3 phase adjustment levers, and the phase adjustment levers may be used to adapt the control system to 4 or more upper pitch links and corresponding rotor blades. In this manner, the requisite delta-3 coupling is achieved at the connection of the phase adjustment levers and pitch links, thus allowing the number of rotor blades to be increased without the blades and control system interfering with each other. The maximum number of rotor blades is limited only by the space available on the rotor to accommodate the blades, and thus any number of blades that fits on the rotor is supported. In some embodiments, for example, a rotor with a control system that uses 3 underlying control links of various types may support from 4 to 20 blades (or more) depending on the size of the rotor and blades. In this manner, the rotor can be adapted to support the number of rotor blades desired for performance purposes, while still achieving the optimal delta-3 coupling. In addition, given that the location of the pitch horn still dictates the delta-0 parameter but it no longer dictates the delta-3 parameter, the rotor is able to achieve both pitch-flap coupling and pitch-cone coupling. Moreover, in some embodiments, the rotor can be adapted to support uneven blade spacing and/or a multiplane hub arrangement. The described embodiments are particularly beneficial for implementing tiltrotors with more than 3 blades (e.g., tiltrotors 112 of tiltrotor aircraft 100), as it is crucial for tiltrotor aircraft to maintain the appropriate delta-3 coupling for stability during high-speed axial flow flight.

Example embodiments are described below with more particular reference to the remaining FIGURES. It should be appreciated that tiltrotor aircraft 100 of FIG. 1 is merely illustrative of a variety of aircraft that can be used with embodiments described throughout this disclosure. Other aircraft implementations can include, for example, a variety of rotorcraft and/or helicopter configurations, hybrid aircraft, unmanned aircraft, gyrocopters, fixed wing airplanes, and drones, among other examples. Moreover, the described embodiments can also be used for other non-aircraft implementations, including land, water, and/or space-based vehicles, among other examples.

Figure 2A:
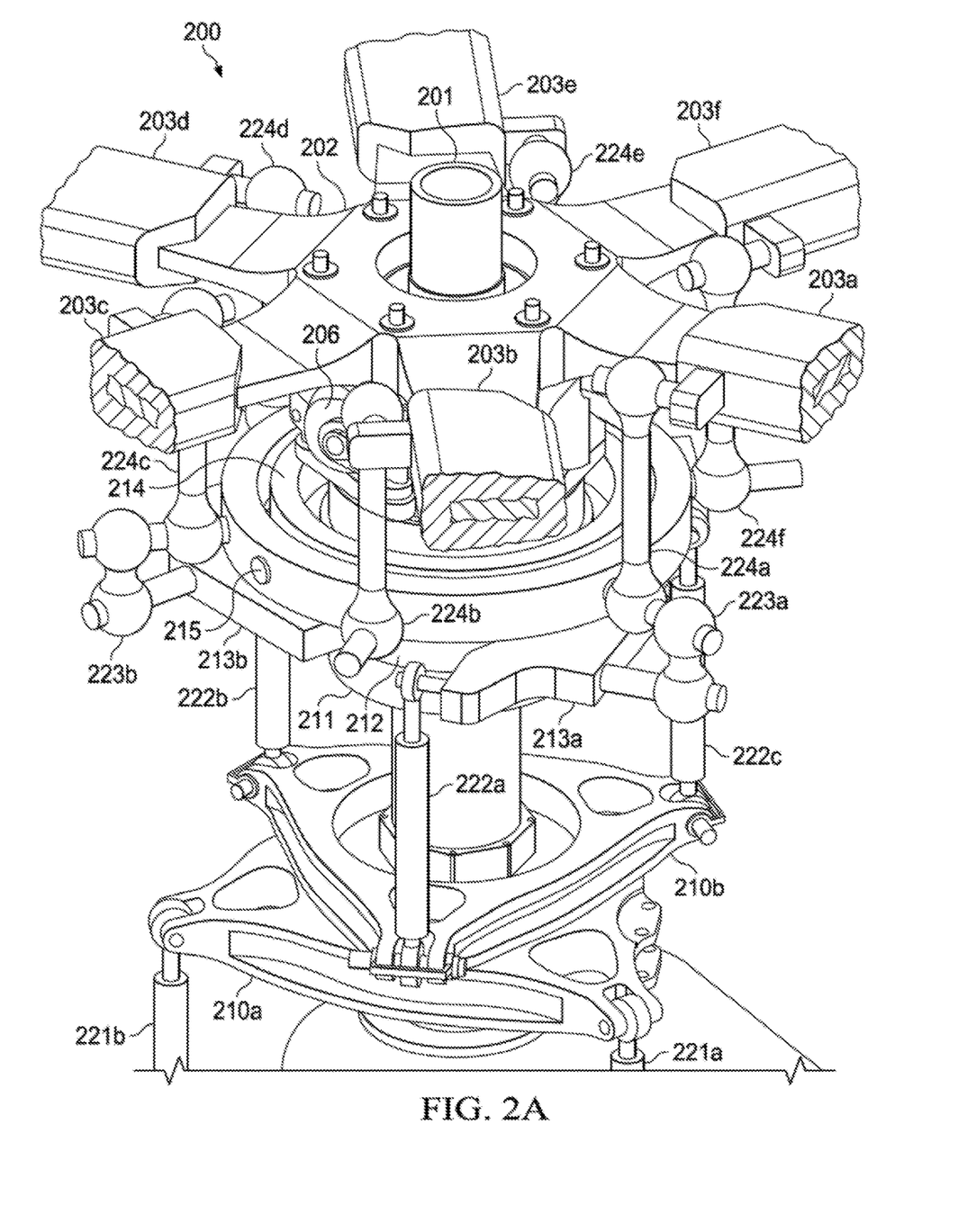
FIGS. 2A-C illustrate an example embodiment of a rotor with a blade control adapter system above the swashplate.
Figure 2B:
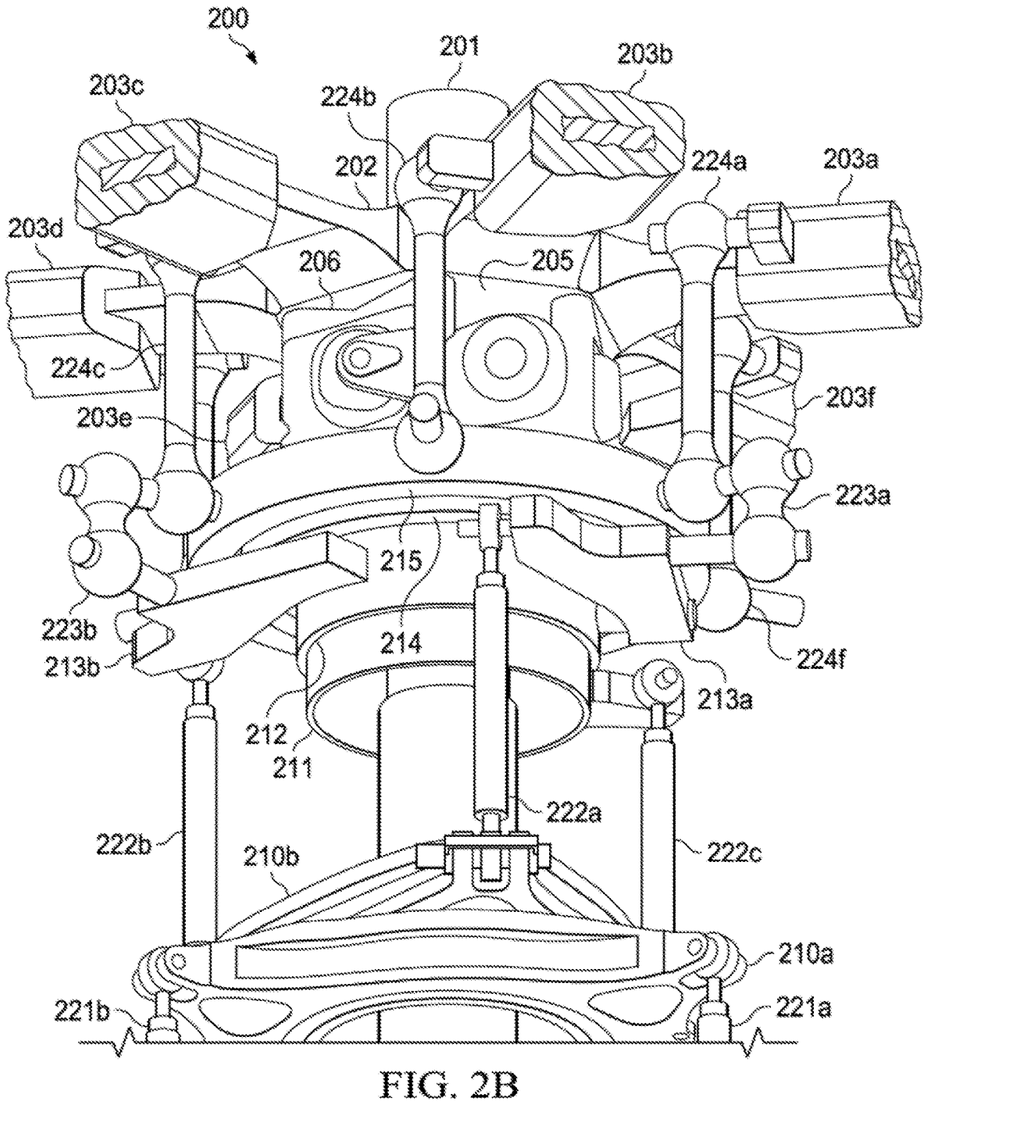
Figure 2C:
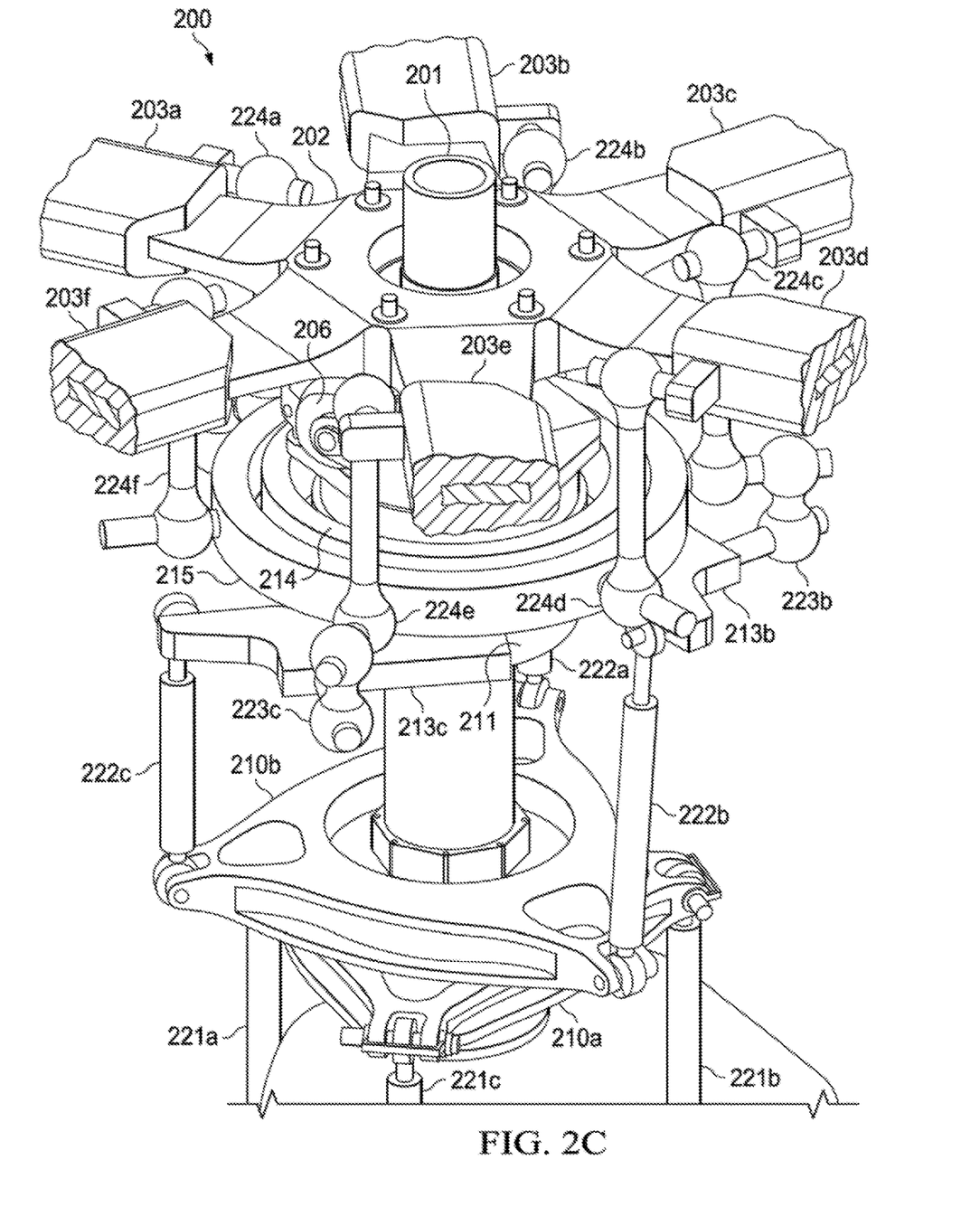

FIGS. 2A-C illustrate an example embodiment of a rotor 200 with a blade control adapter system above the swashplate. The blade control adapter system allows rotor 200 to use more than three rotor blades while still achieving the appropriate delta-3 or pitch-flap coupling. Although the illustrated embodiment of rotor 200 is designed for six rotor blades, other embodiments may be designed for any number of blades, as the maximum number of blades is limited only by the space available on the rotor to accommodate the blades. In some embodiments, rotor 200 could be used to implement a rotor on a rotorcraft, such as tiltrotors 112 of tiltrotor aircraft 100 from FIG. 1.

In the illustrated embodiment, rotor 200 includes a mast 201, yoke 202, constant velocity (CV) joint 206, and swashplate 210. Mast 201 is configured to rotate around an axis to drive torque to components of rotor 200. Yoke 202 is used to attach a plurality of rotor blades (not shown) to rotor 200, thus serving as a hub for the rotor blades. For example, in the illustrated embodiment, yoke 202 includes six arms with corresponding blade grips 203a-f that can be used to attach six corresponding rotor blades. In other embodiments, however, yoke 202 may be designed for any number of rotor blades. In the illustrated embodiment, yoke 202 is a bearingless yoke, which can be beneficial for a rotor with a large number of blades, as it provides a minimized in-plane dimension and may reduce the complexity and part count of the rotor. In other embodiments, however, any other type of yoke or hub mechanism can be used. Yoke 202 is coupled to a constant velocity (CV) joint 206, which is used to drive torque from mast 201 to yoke 202 (e.g., using drive links and/or pillow blocks), and to allow yoke 202 to pivot or gimbal relative to mast 201, thus allowing yoke 202 to flap relative to mast 201 to facilitate blade flapping. In the illustrated embodiment, a hub spring 205 is positioned between yoke 202 and CV joint 206 to provide additional support and load balancing. In some embodiments, for example, hub spring 205 may be formed using spherical elastomeric bearings. Swashplate 210 is configured to translate the flight control inputs (e.g., from the pilot) into corresponding movements by the rotor blades. In the illustrated embodiment, for example, swashplate 210 includes a lower stationary swashplate 210a and an upper rotating swashplate 210b. The stationary swashplate 210a is controlled by a plurality of actuators 221a-c connected to the flight control inputs, and is restrained from rotating but can tilt in all directions and move vertically. The rotating swashplate 210b is configured to rotate with the mast 201, but otherwise tilts and slides vertically as a single unit with the stationary swashplate 210a. Moreover, through a series of control mechanisms, movement from the rotating swashplate 210b causes the orientation of the rotor blades (e.g., blade pitch) to be altered in a manner designed to effectuate a particular maneuver corresponding to the flight control inputs.

In conventional rotor systems, converting swashplate movement into the appropriate blade pitch adjustments may be achieved using a single set of pitch links coupling the rotating swashplate to the pitch horn of each rotor blade. Moreover, in order to achieve the optimal delta-3 pitch-flap coupling in conventional rotor systems, each pitch horn may be offset from the associated rotor blade. However, for a rotor with more than three blades, it can be difficult and/or infeasible to achieve the optimal delta-3 pitch-flap coupling using conventional rotor control systems, as the location of each pitch horn may interfere with the neighboring blade. In particular, for tiltrotor aircraft, achieving the optimal delta-3 coupling (e.g., −5 to −15 degrees) using conventional rotor systems may be infeasible for tiltrotors with more than three blades.

Accordingly, in the illustrated embodiment, rotor 200 is designed to achieve the optimal delta-3 coupling for any number of rotor blades using a blade control adapter system, which allows the underlying control system of rotor 200 to be adapted to the desired number of rotor blades. For example, rotor 200 includes multiple tiers of pitch links 222-224, along with phase adjustment levers 213 to adapt the control phase of lower pitch links 222 in the underlying control system to upper pitch links 224 coupled to the rotor blades. Accordingly, the number of lower pitch links 222 in the underlying control system can remain fixed, while the number of upper pitch links 224 coupled to the rotor blades can vary based on the desired number of rotor blades. Moreover, the requisite delta-3 coupling is achieved at the connection of the lower pitch links 222 and phase adjustment levers 213 (e.g., which is where the flapped and un-flapped portions of the rotor meet), rather than at the connection of the upper pitch links 224 and blade pitch horns, thus eliminating the need to offset the pitch horns from the rotor blades in order to achieve the desired delta-3 coupling, and instead allowing the pitch horns to be positioned closer to the blades. In this manner, the number of blades on rotor 200 can be increased without impacting the number and spacing of components in the underlying control system, such as lower pitch links 222 and phase adjustment levers 213. Moreover, although an additional pitch horn and upper pitch link 224 are required for each additional blade, those components can be added without interfering with neighboring blades given that each pitch horn can be positioned near its associated blade rather than being offset from the blade.

In the illustrated embodiment, for example, rotor 200 includes three lower pitch links 222a-c coupling the rotating swashplate 210b to three phase adjustment levers 213a-c, three middle pitch links 223a-c coupling the phase adjustment levers 213a-c to an adapter ring 215, and six upper pitch links 224a-f coupling the adapter ring 215 to the pitch horn for each of the six rotor blades (not shown) that can be attached using blade grips 203a-f. The lower pitch links 222 are positioned at appropriate offsets for achieving the desired delta-3 coupling, while the upper pitch links 224 and pitch horns are positioned near the associated rotor blades. The phase adjustment levers 213 extend laterally relative to the pitch links and are coupled to a fulcrum 212 that allows them to pivot. Moreover, each phase adjustment lever 213 is coupled to an output of a lower pitch link 222, and also to a middle pitch link 223 that is coupled to the adapter ring 215. The adapter ring 215 is then coupled to the upper pitch links 224, and each upper pitch link 224 is coupled to a pitch horn on the blade grip 203 for one of the rotor blades supported by the rotor. The phase adjustment levers 213 are used to adapt the lower pitch links 222 to the upper pitch links 224, for example, by adjusting the control phase of the lower pitch links 222 and transferring the output to the upper pitch links 224. Rotor 200 further includes a collective sleeve 211, which is configured to slide vertically based on the collective input and is also allowed to flap with the yoke 202. The collective sleeve 211 serves as a mount for the fulcrum 212 associated with the phase adjustment levers 213, and also serves as a mount for a gimbal ring 214 associated with the adapter ring 215. The gimbal ring 214 is used as a mount for the adapter ring 215, and allows the adapter ring 215 to flap with the sleeve 211 but also slide vertically relative to the sleeve 211. In some embodiments, the fulcrum 212 may be configured to slide vertically on the sleeve 211 in order to remain distance-locked with the gimbal ring 214, while in other embodiments the fulcrum 212 may be grounded to the sleeve 211.

Accordingly, when the flight control inputs cause the actuators 221 to induce swashplate 210 movement, the swashplate 210 movement is transferred to one or more of the lower pitch links 222. The movement or output from a lower pitch link 222 causes an associated phase adjustment lever 213 to pivot, causing the lever 213 to transfer the motion at a shifted offset or control phase to the adapter ring 215 via a middle pitch link 223. The motion is then transferred from the adapter ring 215 to one or more of the upper pitch links 224, and then from each of those upper pitch links 224 to a corresponding pitch horn on the blade grip 203 of a particular rotor blade, causing the blade pitch to be adjusted.

When the rotor flaps, on the other hand, the pitch horn on the blade grip 203 of a particular blade either pulls up or pushes down on the associated upper pitch link 224 (depending on whether the particular blade flaps up or down), causing a similar pulling or pushing force to be exerted on the adapter ring 215, then a middle pitch link 223, then a phase adjustment lever 213 (which shifts the control offset), then a lower pitch link 222, and then the swashplate 210. However, since the swashplate 210 is grounded to the actuators 221 and can only move vertically when allowed by the actuators 221, the pulling or pushing force originating from the pitch horn can only cause the swashplate 210 to tilt rather than move vertically, which results in the pulling or pushing force being restrained by the swashplate 210. Moreover, since the pulling or pushing force originates from a pitch horn during blade flapping, the pitch horn is similarly restrained from following the blade flapping movement, which causes the pitch horn to induce a change in blade pitch, thus achieving the desired delta-3 or pitch-flap coupling. In this manner, the desired delta-3 behavior is dictated by the offset of the lower pitch links 222, yet that behavior is extended to the upper pitch links 224, even though the upper pitch links 224 and the associated pitch horns are positioned near the blades rather than at the appropriate delta-3 offset. Accordingly, since the upper pitch links 224 and associated pitch horns can be positioned near their respective blades rather than at an appropriate delta-3 offset, the number of blades on rotor 200 can be increased without interference between neighboring blades and their associated control components.

Finally, given that the location of the pitch horn still dictates the delta-0 parameter even though it no longer dictates the delta-3 parameter, rotor 200 is able to achieve both pitch-flap coupling and pitch-cone coupling, rather than only one or the other.

Figure 3A:
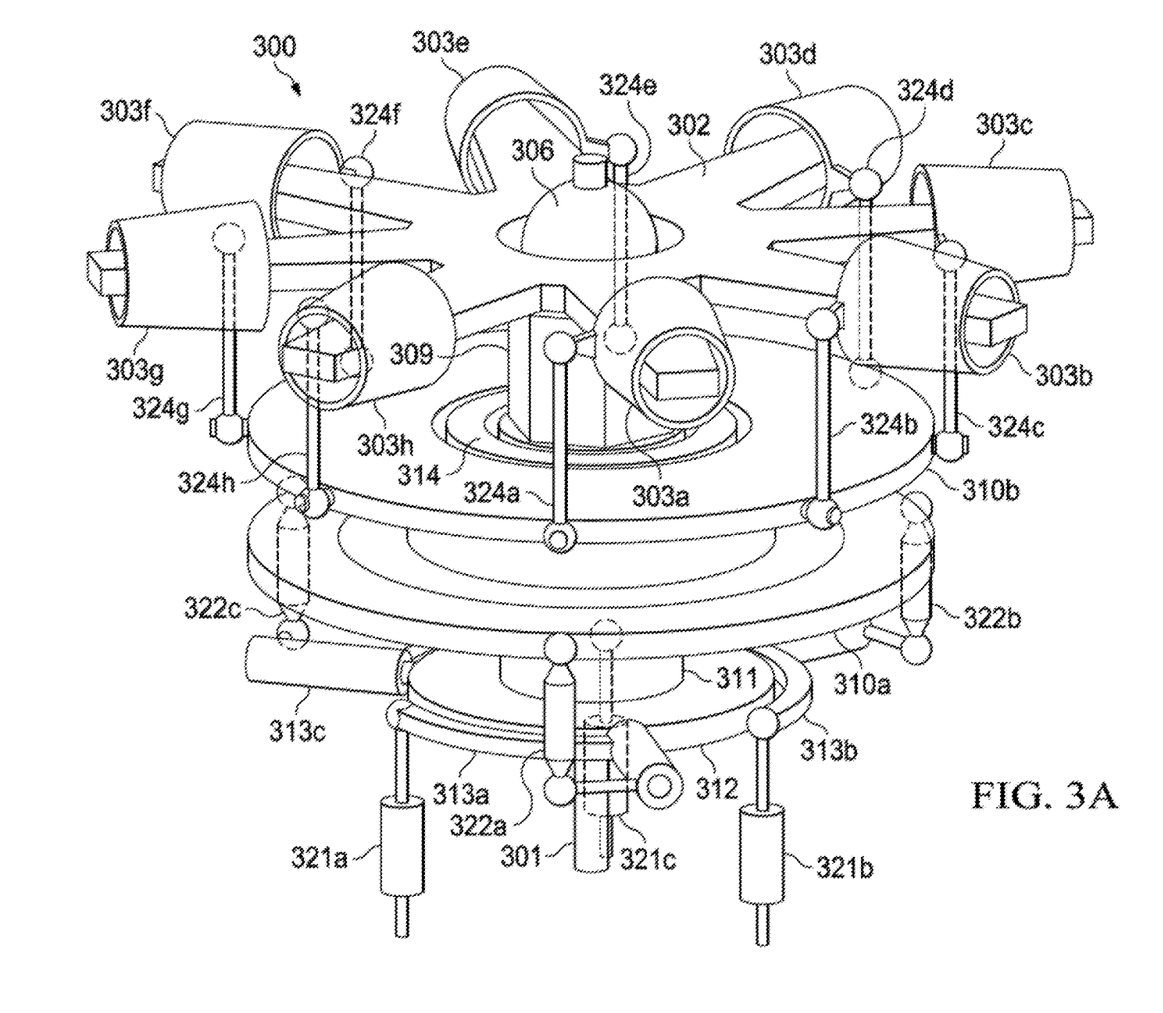
FIGS. 3A-B illustrate an example embodiment of a rotor with a blade control adapter system below the swashplate.
Figure 3B:
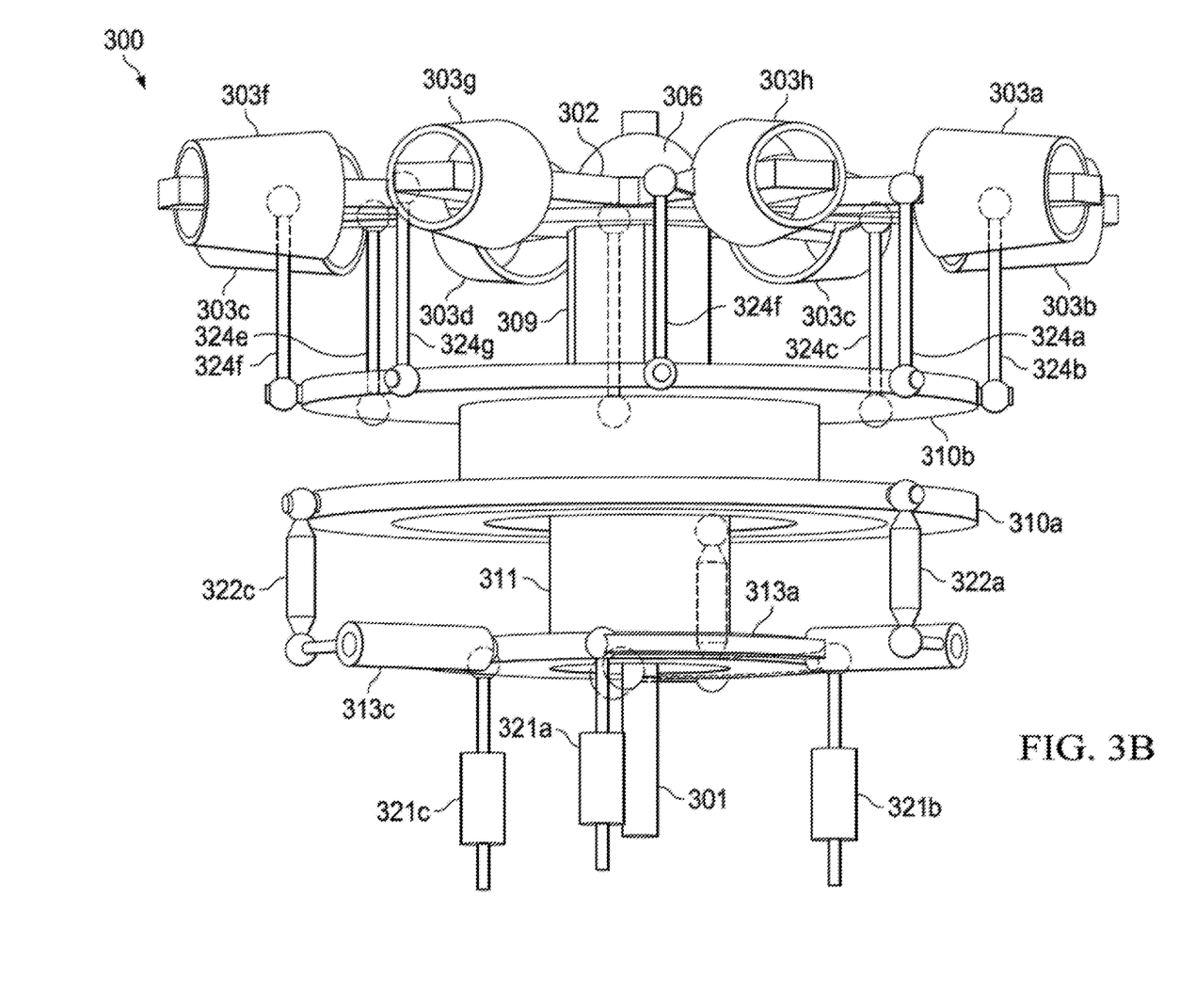

FIGS. 3A-B illustrate an example embodiment of a rotor 300 with a blade control adapter system below the swashplate. The blade control adapter system allows rotor 300 to use more than three rotor blades while still achieving the appropriate delta-3 or pitch-flap coupling. Although the illustrated embodiment of rotor 300 is designed for eight rotor blades, other embodiments may be designed for any number of blades, as the maximum number of blades is limited only by the space available on the rotor to accommodate the blades. In some embodiments, rotor 300 could be used to implement a rotor on a rotorcraft, such as tiltrotors 112 of tiltrotor aircraft 100 from FIG. 1.

In the illustrated embodiment, rotor 300 includes a mast 301, yoke 302, constant velocity (CV) joint 306, and swashplate 310. Mast 301 is configured to rotate around an axis to drive torque to components of rotor 300. Yoke 302 is used to attach a plurality of rotor blades (not shown) to rotor 300, thus serving as a hub for the rotor blades. For example, in the illustrated embodiment, yoke 302 includes eight arms with corresponding blade grips 303a-h that can be used to attach eight corresponding rotor blades. In other embodiments, however, yoke 302 may be designed for any number of rotor blades. In the illustrated embodiment, yoke 302 is a bearingless yoke, which can be beneficial for a rotor with a large number of blades, as it provides a minimized in-plane dimension and may reduce the complexity and part count of the rotor. In other embodiments, however, any other type of yoke or hub mechanism can be used. Yoke 302 is coupled to a constant velocity (CV) joint 306, which is used to drive torque from mast 301 to yoke 302 (e.g., using drive links and/or pillow blocks in some embodiments), and to allow yoke 302 to pivot or gimbal relative to mast 301, thus allowing yoke 302 to flap relative to mast 301 to facilitate blade flapping. In some embodiments, a hub spring may also be positioned between yoke 302 and CV joint 306 to provide additional support and load balancing. The hub spring, for example, may be formed using spherical elastomeric bearings. Swashplate 310 is configured to translate the flight control inputs (e.g., from the pilot) into corresponding movements by the rotor blades. In the illustrated embodiment, for example, swashplate 310 includes a lower stationary swashplate 310a and an upper rotating swashplate 310b. The stationary swashplate 310a is restrained from rotating but can tilt in all directions and move vertically. The rotating swashplate 310b is configured to rotate with the mast 301, but otherwise tilts and slides vertically as a single unit with the stationary swashplate 310a. Moreover, through a series of control mechanisms, movement from the rotating swashplate 310b causes the orientation of the rotor blades (e.g., blade pitch) to be altered in a manner designed to effectuate a particular maneuver corresponding to the flight control inputs.

In conventional rotor systems, converting swashplate movement into the appropriate blade pitch adjustments may be achieved using a single set of pitch links coupling the rotating swashplate to the pitch horn of each rotor blade. Moreover, in order to achieve the optimal delta-3 pitch-flap coupling in conventional rotor systems, each pitch horn may be offset from the associated rotor blade. However, for a rotor with more than three blades, it can be difficult and/or infeasible to achieve the optimal delta-3 pitch-flap coupling using conventional rotor control systems, as the location of each pitch horn may interfere with the neighboring blade. In particular, for tiltrotor aircraft, achieving the optimal delta-3 coupling (e.g., −5 to −15 degrees) using conventional rotor systems may be infeasible for tiltrotors with more than three blades.

Accordingly, in the illustrated embodiment, rotor 300 is designed to achieve the optimal delta-3 coupling for any number of rotor blades using a blade control adapter system, which allows the underlying control system of rotor 300 to be adapted to the desired number of rotor blades. For example, rotor 300 includes actuators 321, multiple tiers of pitch links 322 and 324, and phase adjustment levers 313. The phase adjustment levers 313 are used to adapt the control phase of the underlying control system to match the control phase of the pitch link to pitch horn joint. For example, the control phase associated with the position of the underlying actuators 321 is adjusted by the phase adjustment levers 313 to match the control phase associated with the position of the lower pitch links 322, upper pitch links 324, and pitch horns. The number of actuators 321 and lower pitch links 322 in the underlying control system can remain fixed, while the number of upper pitch links 324 coupled to the pitch horns for the rotor blades can vary based on the desired number of blades. Moreover, the requisite delta-3 coupling is achieved at the connection of the actuators 321 and phase adjustment levers 313 (which is where the flapped and un-flapped portions of the rotor meet), rather than at the connection of the upper pitch links 324 and blade pitch horns, thus eliminating the need to offset the pitch horns from the rotor blades in order to achieve the desired delta-3 coupling, and instead allowing the pitch horns to be positioned closer to the blades. In this manner, the number of blades on rotor 300 can be increased without impacting the number and spacing of various components in the underlying control system, such as actuators 321, lower pitch links 322, and phase adjustment levers 313. Moreover, although an additional pitch horn and upper pitch link 324 are required for each additional blade, those components can be added without interfering with neighboring blades given that each pitch horn can be positioned near its associated blade rather than being offset from the blade.

In the illustrated embodiment, for example, rotor 300 includes a swashplate support sleeve 309, which is coupled to the yoke 302 in order to allow the swashplate 310 to flap with the yoke 302. A collective sleeve 311 is mounted on the swashplate support sleeve 309, and the collective sleeve 311 is configured to slide vertically based on the collective input and also flap with the yoke 302. A gimbal ring 314 associated with the upper rotating swashplate 310*b* is mounted on the collective sleeve 311, and the upper rotating swashplate 310*b* is then mounted on the gimbal ring 314. In this manner, the gimbal ring 314 allows the upper rotating swashplate 310*b* to flap with the collective sleeve 311 but also slide vertically relative to the collective sleeve 311. A phase adapter fulcrum 312 is also mounted on the collective sleeve 311 below the swashplate 310. The fulcrum 312 is used as a pivot mount for three phase adjustment levers 313*a-c*, allowing the phase adjustment levers 313 to pivot relative to the fulcrum 312. The three phase adjustment levers 313*a-c* are used to couple three actuators 321*a-c* to three lower pitch links 322*a-c*. The actuators 321 are controlled by the flight control inputs and are configured to transfer motion to the phase adjustment levers 313 based on the flight control inputs. The phase adjustment levers 313 are configured to transfer motion between the actuators 321 and the lower pitch links 322, while also adapting the control phase of the actuators 321 to that of the lower pitch links 322. For example, the actuators 321 are positioned at appropriate offsets for achieving the desired delta-3 coupling, while the lower pitch links 322 are aligned with the upper pitch links 324 and associated pitch horns, which are positioned near the associated rotor blades. Moreover, the phase adjustment levers 313 extend laterally relative to the actuators 321 and lower pitch links 322. In this manner, when the phase adjustment levers 313 transfer motion between the actuators 321 and lower pitch links 322, the control phase associated with the position of the actuators 321 is shifted to match the control phase associated with the position of the lower pitch links 322. Moreover, in the illustrated embodiment, the length of the step-over linkage from the phase adjustment levers 313 to the lower pitch links 322 is equal to the distance between the pitch change axis (PCA) and the upper pitch links 324, which prevents the pitch-flap coupling response from being amplified. The lower pitch links 322 couple the phase adjustment levers 313 to the lower stationary swashplate 310*a*, and thus are configured to transfer motion between the phase adjustment levers 313 and lower stationary swashplate 310*a*. The lower stationary swashplate 310*a* and the upper rotating swashplate 310*b* are coupled to each other and are configured to tilt and slide vertically as a single unit, but only the upper rotating swashplate 310*b* rotates with the mast 301. The upper rotating swashplate 310*b* is then coupled to eight upper pitch links 324*a-h*. The upper pitch links 324 are used to couple the upper rotating swashplate 310*b* to the pitch horns on the blade grips 303*a-h* for the eight rotor blades (not shown) supported by rotor 300.

Accordingly, when the flight control inputs cause one or more actuators 321 to move, the movement from a particular actuator 321 is transferred to a corresponding phase adjustment lever 313, causing the lever 313 to pivot, which then causes the movement to be transferred from the lever 313 to a corresponding lower pitch link 322 at a shifted offset or control phase. The motion is then transferred from the lower pitch link 322 to the lower stationary swashplate 310*a*, then to the upper rotating swashplate 310*b*, then to one or more of the upper pitch links 324, and finally from each of those upper pitch links 324 to a corresponding pitch horn on a blade grip 303 for a particular rotor blade, causing the blade pitch to be adjusted.

When the rotor flaps, on the other hand, the pitch horn on the blade grip 303 for a particular blade either pulls up or pushes down on the associated upper pitch link 324 (depending on whether the particular blade flaps up or down), causing a similar pulling or pushing force to be exerted on the upper rotating swashplate 310*b*, then the lower stationary swashplate 310*a*, then a lower pitch link 322, then a phase adjustment lever 313 (which shifts the control offset), and finally an actuator 321. However, since an actuator 321 only moves in response to flight control inputs, the actuator 321 remains fixed in response to the pulling or pushing force, thus restraining the phase adjustment lever 313 from moving vertically and instead forcing it to pivot. This ultimately restrains the pitch horn from following the blade through the full flapping motion, and instead causes the pitch horn to induce a change in blade pitch in response to the blade flapping, thus achieving a pitch-flap or delta-3 coupling. The delta-3 coupling is achieved at the connection of the actuators 321 and phase adjustment levers 313, as that is where the flapped and un-flapped portions of the rotor meet. In this manner, while the desired delta-3 behavior is dictated by the position or offset of the actuators 321, that behavior is extended to the pitch links 322 and 324 and pitch horns, which are positioned near the blades rather than at the appropriate delta-3 offset. Accordingly, since the pitch links and pitch horns can be positioned near their respective blades rather than at an appropriate delta-3 offset, the number of blades on rotor 300 can be increased without interference between neighboring blades and their associated control components.

Finally, given that the location of the pitch horn still dictates the delta-0 parameter even though it no longer dictates the delta-3 parameter, rotor 300 is able to achieve both pitch-flap coupling and pitch-cone coupling, rather than only one or the other.

The FIGURES illustrate the architecture, functionality, and operation of possible implementations of various embodiments of the present disclosure. Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotor hub, comprising:
a yoke configured to attach a plurality of rotor blades; and
a rotor control system configured to adjust an orientation of the plurality of rotor blades, wherein the rotor control system comprises:
a swashplate;
a plurality of actuators configured to adjust an orientation of the swashplate based on a flight control input;
a plurality of lower pitch links configured to transfer motion between the plurality of actuators and the swashplate;
a plurality of phase adjustment levers configured to adjust a control phase associated with motion transferred between the plurality of actuators and the plurality of lower pitch links; and
a plurality of upper pitch links configured to adjust a pitch of the plurality of rotor blades, wherein the plurality of upper pitch links comprises a larger number of pitch links than the plurality of lower pitch links.

2. The rotor hub of claim 1, wherein the plurality of phase adjustment levers is further configured to transfer motion between the plurality of actuators and the plurality of lower pitch links.

3. The rotor hub of claim 1, wherein the plurality of phase adjustment levers is coupled to the plurality of actuators and the plurality of lower pitch links.

4. The rotor hub of claim 3, wherein the plurality of phase adjustment levers is further configured to pivot relative to a phase adapter fulcrum of the rotor control system.

5. The rotor hub of claim 3, wherein the plurality of phase adjustment levers extends laterally relative to the plurality of actuators.

6. The rotor hub of claim 3, wherein the plurality of lower pitch links is coupled to the plurality of phase adjustment levers and the swashplate.

7. The rotor hub of claim 1, wherein the rotor control system further comprises a sleeve configured to slide vertically relative to the rotor mast and further configured to pivot relative to the rotor mast.

8. The rotor hub of claim 7, wherein the rotor control system further comprises a gimbal configured to slide vertically relative to the sleeve, wherein the swashplate is coupled to the gimbal.

9. The rotor hub of claim 1, wherein:
the plurality of lower pitch links comprises three lower pitch links; and
the plurality of upper pitch links comprises at least four upper pitch links, wherein each upper pitch link of the plurality of upper pitch links is coupled to a particular rotor blade of the plurality of rotor blades.

10. A rotor, comprising:
a plurality of rotor blades; and
a rotor hub, comprising:
a yoke coupled to the plurality of rotor blades; and
a rotor control system configured to adjust an orientation of the plurality of rotor blades, wherein the rotor control system comprises:
a swashplate;
a plurality of actuators configured to adjust an orientation of the swashplate based on a flight control input;
a plurality of lower pitch links configured to transfer motion between the plurality of actuators and the swashplate;
a plurality of phase adjustment levers configured to adjust a control phase associated with motion transferred between the plurality of actuators and the plurality of lower pitch links; and
a plurality of upper pitch links configured to adjust a pitch of the plurality of rotor blades, wherein the plurality of upper pitch links comprises a larger number of pitch links than the plurality of lower pitch links.

11. The rotor of claim 10, wherein the plurality of phase adjustment levers is further configured to transfer motion between the plurality of actuators and the plurality of lower pitch links.

12. The rotor of claim 10, wherein the plurality of phase adjustment levers is coupled to the plurality of actuators and the plurality of lower pitch links.

13. The rotor of claim 12, wherein the plurality of phase adjustment levers is further configured to pivot relative to a phase adapter fulcrum of the rotor control system.

14. The rotor of claim 12, wherein the plurality of lower pitch links is coupled to the plurality of phase adjustment levers and the swashplate.

15. The rotor of claim 10, wherein:
the plurality of lower pitch links comprises three lower pitch links; and
the plurality of upper pitch links comprises at least four upper pitch links, wherein each upper pitch link of the plurality of upper pitch links is coupled to a particular rotor blade of the plurality of rotor blades.

16. An aircraft, comprising:
a fuselage; and
one or more rotors, wherein each of the one or more rotors comprises:
a plurality of rotor blades;
a rotor hub, comprising:
a yoke coupled to the plurality of rotor blades; and
a rotor control system configured to adjust an orientation of the plurality of rotor blades, wherein the rotor control system comprises:
a swashplate;
a plurality of actuators configured to adjust an orientation of the swashplate based on a flight control input;
a plurality of lower pitch links configured to transfer motion between the plurality of actuators and the swashplate;
a plurality of phase adjustment levers configured to adjust a control phase associated with motion transferred between the plurality of actuators and the plurality of lower pitch links; and
a plurality of upper pitch links configured to adjust a pitch of the plurality of rotor blades, wherein the plurality of upper pitch links comprises a larger number of pitch links than the plurality of lower pitch links.

17. The aircraft of claim 16, wherein the plurality of phase adjustment levers is coupled to the plurality of actuators and the plurality of lower pitch links.

18. The aircraft of claim 17, wherein the plurality of phase adjustment levers is further configured to pivot relative to a phase adapter fulcrum of the rotor control system.

19. The aircraft of claim 16, wherein:
the plurality of lower pitch links comprises three lower pitch links; and
the plurality of upper pitch links comprises at least four upper pitch links, wherein each upper pitch link of the plurality of upper pitch links is coupled to a particular rotor blade of the plurality of rotor blades.

20. The aircraft of claim 16, wherein the aircraft comprises a tiltrotor aircraft.

* * * * *